US009071031B2

(12) United States Patent
Villarreal-Saucedo et al.

(10) Patent No.: US 9,071,031 B2
(45) Date of Patent: Jun. 30, 2015

(54) RF-EXCITED LASER ASSEMBLY

(75) Inventors: Francisco Javier Villarreal-Saucedo, Avon, CT (US); Jesus Fernando Monjardin-Lopez, West Hartford, CT (US); Peter Daniel, Farmington, CT (US); Jochen Deile, West Hartford, CT (US); Shadi Sumrain, Avon, CT (US); Viktor Granson, New Britian, CT (US)

(73) Assignee: Trumpf, Inc., Farmington, CT (US)

( * ) Notice: Subject to any disclaimer, the term of this patent is extended or adjusted under 35 U.S.C. 154(b) by 334 days.

(21) Appl. No.: 13/286,048

(22) Filed: Oct. 31, 2011

(65) Prior Publication Data
US 2012/0106586 A1  May 3, 2012

Related U.S. Application Data

(60) Provisional application No. 61/408,197, filed on Oct. 29, 2010.

(51) Int. Cl.
*H01S 3/097* (2006.01)
*H01S 3/038* (2006.01)
*H01S 3/07* (2006.01)
(Continued)

(52) U.S. Cl.
CPC ........... *H01S 3/038* (2013.01); *H01F 2005/006* (2013.01); *H01S 3/076* (2013.01); *H01S 3/09705* (2013.01); *H01S 3/0971* (2013.01); *H01S 3/2232* (2013.01)

(58) Field of Classification Search
CPC ..... H01S 3/038; H01S 3/076; H01S 3/09705; H01S 3/0971; H01S 3/2232; H01S 5/0071; H01S 5/02248

USPC .......................................... 372/55–65, 81, 82
See application file for complete search history.

(56) References Cited

U.S. PATENT DOCUMENTS 3,702,973 A * 11/1972 Daugherty et al. ............. 372/74
4,493,087 A *  1/1985 Laakman et al. ............... 372/64
(Continued)

FOREIGN PATENT DOCUMENTS

DE            9314335 U1     3/1995

OTHER PUBLICATIONS

Granson et al., "Power Scaling Issued of Diffusion Cooled Annular CO2 Lasers in the Multi-Kilowatt Region", Proceedings of SPIE, vol. 6872, Jan. 21, 2008, pp. 687209-687209-10.
(Continued)

*Primary Examiner* — Colleen A Matthews
*Assistant Examiner* — Delma R Forde
(74) *Attorney, Agent, or Firm* — Fish & Richardson P.C.

(57) ABSTRACT

A radio frequency (RF) excited laser assembly includes a pair of opposed electrodes defining an inter-electrode gap and a conductive termination bridge in electrical contact with both electrodes. The termination bridge mechanically supports and positions the electrodes relative to each other and provides a termination impedance for an RF voltage applied to the electrodes. A conical spiral inductor includes one or more metals windings, and one or more concentric terminals, such that the conical spiral inductor defines an inter-winding spacing sufficient to mitigate ionization of a gas medium between windings. A radio frequency (RF) feed-through assembly configured to apply an RF voltage to a pair of opposing electrodes such that a conductor is isolated from a metal sleeve position around the conductor by ion sheath discharge barrier.

21 Claims, 12 Drawing Sheets

(51) Int. Cl.
  *H01S 3/0971* (2006.01)
  *H01F 5/00* (2006.01)
  *H01S 3/223* (2006.01)

(56) References Cited

U.S. PATENT DOCUMENTS

| | | | | |
|---|---|---|---|---|
| 5,748,663 | A | * | 5/1998 | Chenausky ................... 372/64 |
| 6,192,061 | B1 | * | 2/2001 | Hart et al. ..................... 372/87 |
| 6,285,703 | B1 | * | 9/2001 | Schluter ........................ 372/95 |
| 6,704,333 | B2 | * | 3/2004 | Tulip ...................... 372/29.013 |
| 6,711,201 | B2 | * | 3/2004 | Vitruk ........................... 372/64 |
| 6,788,722 | B1 | * | 9/2004 | Kennedy et al. ............... 372/64 |
| 7,778,303 | B2 | | 8/2010 | Villarreal-Saucedo et al. |
| 8,116,346 | B2 | * | 2/2012 | Hua et al. ...................... 372/55 |
| 8,265,116 | B2 | * | 9/2012 | Newman et al. ............... 372/55 |
| 8,290,017 | B2 | * | 10/2012 | Newman et al. ............... 372/55 |
| 2002/0061045 | A1 | * | 5/2002 | Zhang et al. .................. 372/61 |
| 2004/0013150 | A1 | | 1/2004 | Tulip |
| 2005/0069008 | A1 | * | 3/2005 | Xin et al. ...................... 372/64 |
| 2009/0116531 | A1 | * | 5/2009 | Villarreal-Saucedo et al. 372/82 |

OTHER PUBLICATIONS

Invitation to Pay Additional Fees and Communication relating the Results of the Partial International Search for corresponding PCT Application No. PCT/US2011/058651, mailed Feb. 14, 2012, 5 pages.

* cited by examiner

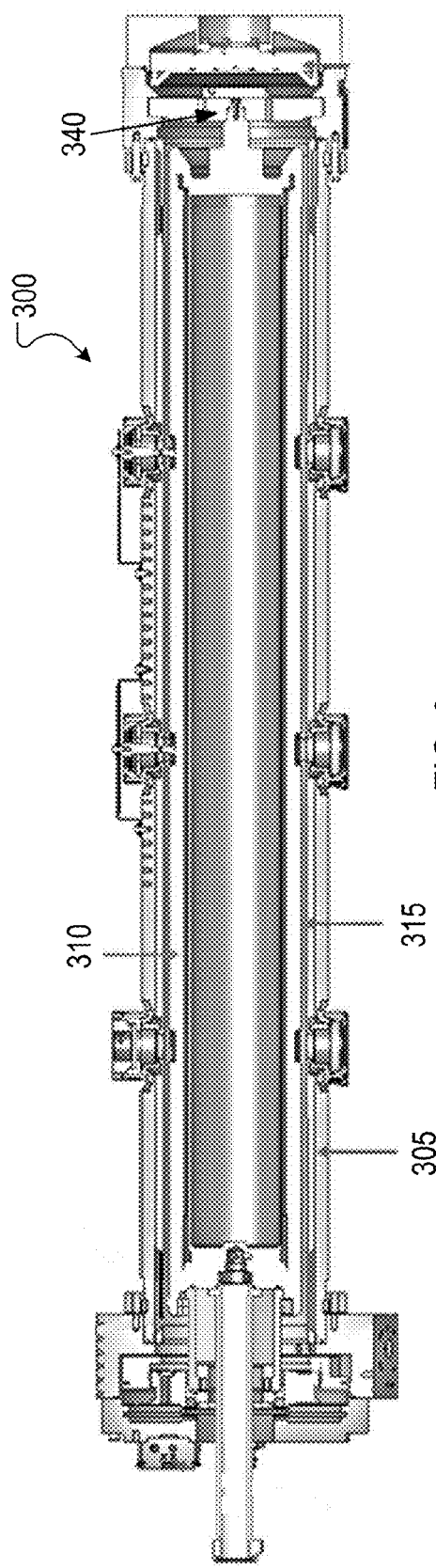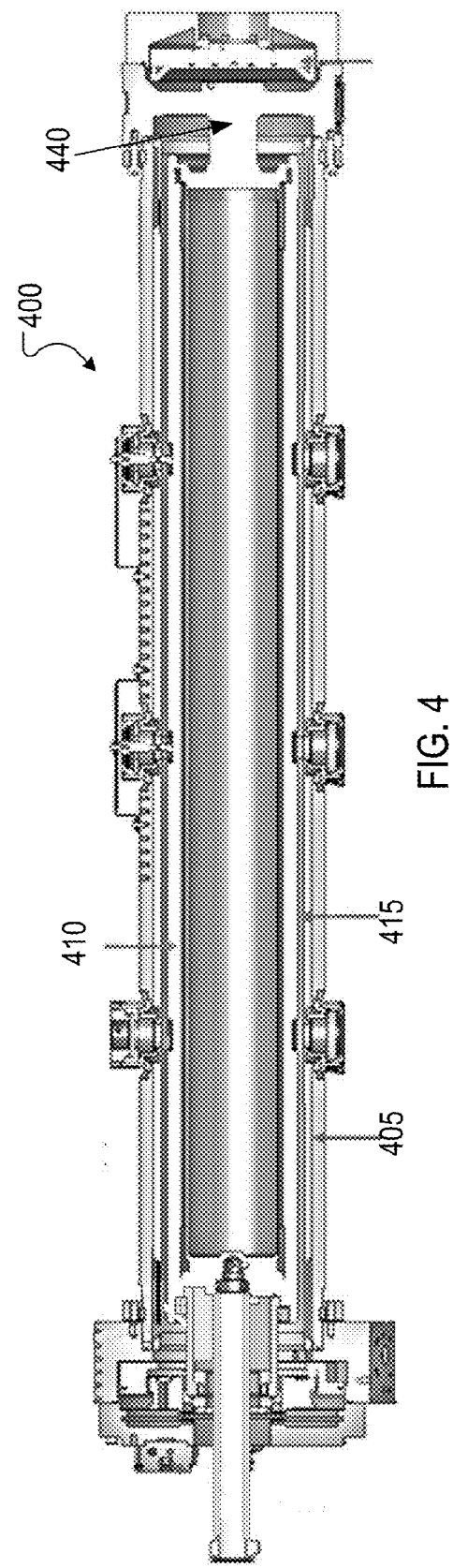
FIG. 3
FIG. 4

RF-EXCITED LASER ASSEMBLY

CROSS-REFERENCE TO RELATED APPLICATION

Under 35 U.S.C. §119(e)(1), this application claims the benefit of prior U.S. provisional application 61/408,197, filed on Oct. 29, 2010, the entire contents of which are hereby incorporated by reference.

TECHNICAL FIELD

The description relates to lasers, and more particularly to all metal gas lasers.

BACKGROUND

Conventional lasers with annular discharge, hybrid resonators, and distributed inductances and conventional diffusion cooled lasers typically use insulating materials between the "live" electrode and ground, and not just in the radio frequency (RF) feed-through. Examples of such lasers include commercially available lasers from TRUMPF (Farmington, Conn.) including TruCoax V3, V4, and V5 production lasers.

FIG. 1A (side-on, cross-sectional view) shows the assembly of an RF excited gas laser that includes a pair of concentric electrodes 1 and 2 that form a discharge gap 11 between them and are electrically insulated and mechanically held at both ends by dielectric parts. The mirrors for the optical resonator are located at the ends of the discharge facing each other. These mirrors are an axicon 7 at one end, which is a retro-reflector, and a helix 8 at the other end, which includes in a single substrate both front and back mirrors of a typical resonator. A laser output window 12 is located on the helix carrier. The electrode assembly includes support blocks at each end to which the resonator mirrors are mounted. Each mirror is mounted on a carrier that serves as a lid for each end of the assembly.

When the outer electrode 1, inner electrode 2, and lids are assembled they form a vacuum tight chamber that holds the laser gas mixture. The inner electrode 2 is held in place by a metal bridge 3 and ceramic inserts 5 and 6. The ceramic inserts electrically insulate the inner electrode from the outer electrode. The ceramic insert 5 at the helix end is shaped like a hollow cylinder that connects the inner electrode 2 and the carrier for the helix. The helix substrate as well as the carrier has a circular opening in the center that gives access through the hollow ceramic insert 5 to the inner electrode 2 at atmospheric pressure. Through this aperture the RF feed-through assembly 9 is connected to the exposed region of the inner electrode 2 to supply RF power and for the supply and return of the cooling fluids for the inner electrode 2. The helix-end ceramic insert 5 keeps the inner electrode 2 insulated from the grounded outer electrode 1. At the axicon 7 end, the inner electrode 2 is electrically connected by an adjustable termination inductor 4 to ground.

When RF power is supplied to the inner electrode 2 through the RF feed-through 9 and a discharge is generated in the gap 11, the electrodes in combination with the generated discharge behave like a lossy transmission line for the RF power. A voltage variation occurs along the length of the electrodes as the RF power propagates in the lossy transmission line. The transmission line is terminated at the axicon 7 end by the internal adjustable termination 4. To further reduce the voltage variations and obtain a uniform discharge, distributed inductors 100 are connected between the outer electrode 1 and the inner electrode 2 at several locations outside the vacuum and along the length of the electrodes with the use of specially designed assemblies.

FIG. 1B shows an example of the coil assembly of this laser as shown and described in U.S. Pat. No. 7,778,303. As shown in FIG. 1B, inductor assembly 100 includes a conductive rod or feed-through 170 that extends through a vacuum-sealed opening 175 of outer electrode 110 and into inter-electrode gap 115. The feed-through 170 terminates at one end at a flexible conductive contact 187 that contacts an outer surface of inner electrode 105 within the vacuum. Inductor assembly 100 also includes a lead 180 that is detachably connected to the feed-through 170 using, for example, a screw 185. Inductor assembly 100 is electrically connected to outer electrode 110 by lead 180 when lead 180 makes suitable electrical contact with the outer surface of the outer electrode 110. By removing screws 185 and 186, the position of lead 180 relative to the outer surface of outer electrode 110 can be adjusted and therefore the current length from feed-through 170 to outer electrode 110 can be adjusted to adjust the value of the inductance that is produced by inductor assembly 100. Therefore, the inductance of inductor assembly 100 can be easily adjusted without having to open the vacuum seal or remove feed-through 170.

SUMMARY

The present disclosure features laser assemblies that include an RF feed-through assembly configured to extend through a port in a first electrode to provide an RF bias to an opposing electrode, one or more impedances configured to be placed within a gas chamber defined by the laser assembly, and/or one or more metal bridge supports separating the electrodes and providing a termination impedance.

In one aspect, the present disclosure provides a radio frequency (RF) excited laser assembly including a pair of opposed electrodes defining an inter-electrode gap; and a conductive termination bridge in electrical contact with both electrodes, wherein the termination bridge mechanically supports and positions the electrodes relative to each other and provides a termination impedance for an RF voltage applied to the electrodes.

In another aspect, the disclosure provides a radio frequency (RF) feed-through assembly configured to apply an RF voltage to a pair of opposing electrodes defining an inter-electrode gap, the assembly comprising a conductor configured to extend through a port defined in a first electrode and across the inter-electrode gap; and a metal sleeve positioned around the conductor; wherein the metal sleeve is configured to be electrically coupled to the first electrode and spaced from the conductor to form a gap having a width sufficient to allow formation of an ion sheath discharge barrier between the conductor and the metal sleeve. In some implementations, the conductor includes a water cooling port.

Still another aspect provided by the present disclosure is a conical spiral inductor including one or more metals windings; and one or more concentric terminals, wherein the conical spiral inductor defines an inter-winding spacing sufficient to mitigate ionization of a gas medium between windings. In some implementations the inductor can be configured to be coupled between coaxial electrodes and to conduct heat generated in the inductor towards at least one of the electrodes. Further, in some examples, the one or more metal windings can have a cross-sectional area sufficient to conduct heat generated within the windings toward a fluid-cooled assembly coupled to the one or more concentric terminals In another aspect, the disclosure features methods of generating a laser discharge. The methods include providing a pair of opposed electrodes defining an inter-electrode gap; providing a conductive termination bridge in electrical contact with both electrodes, wherein the conductive termination bridge mechanically supports and positions the electrodes relative to each other and provides a termination impedance for an RF voltage applied to the electrodes; and applying an RF voltage to the electrodes to generate a laser discharge within the inter-electrode gap. In some implementations, the electrodes can include a first electrode and a second electrode, and the methods can further include: providing an RF feed-through assembly comprising a conductor and a metal sleeve, the conductor extending through a port defined in the first electrode, through the metal sleeve, and across the inter-electrode gap within a discharge-free region, the conductor electrically coupled to the second electrode; and forming an ion sheath discharge barrier between the conductor and the metal sleeve to electrically isolate the conductor from the first electrode, such that the discharge-free region is accessible to a gas medium, but is located at a position in the inter-electrode gap where the gas medium is not excited.

Implementations of these aspects can include one or more of the following features. For example, the electrodes can be concentric electrodes including an inner electrode and an outer electrode, and wherein the electrodes define an annular inter-electrode gap. The inner electrode can include one or more concentric fins adjacent to the termination bridge, and wherein the one or more concentric fins each have a thickness greater than twice the skin depth of the inner electrode at a frequency of the RF voltage. The termination bridge can include one or more complementary concentric fins, such that the one or more concentric fins and the one or more complementary concentric fins are arranged to form a space that in use can be filled with a dielectric gas to form a capacitor. The termination bridge can be a planar, multi-spiral-shaped bridge or a planar, Archimedean-spiral-shaped bridge. The termination bridge can be a T-shaped bridge integrally formed with one of the electrodes. The termination bridge can be a first termination bridge, and the RF excited laser assembly further including a second termination bridge at an end opposite the first termination bridge. The first termination bridge can be a planar, double-spiral-shaped bridge and the second termination bridge can be a T-shaped bridge integrally formed with one of the electrodes. The termination bridge can define a cooling fluid supply path and a cooling fluid return path.

In some embodiments, the RF excited laser assembly can also include a fully enclosed impedance component extending across the inter-electrode gap within a discharge-free region defined by the pair of opposed electrodes, wherein the discharge-free region is accessible to a gas medium, but is located at a position in the inter-electrode gap where the gas medium is not excited. The impedance component is a conical spiral inductor. The RF excited laser assembly can further include a metal cap and a metal clamp configured to secure the conical inductor to the laser assembly, wherein the metal cap, the metal clamp, and the conical inductor together form an all-metal inductor assembly. The conical spiral inductor can define an inter-winding spacing sufficient to mitigate ionization of a gas medium between windings. The impedance component can be configured to conduct heat generated in the impedance component towards at least one of the electrodes. The RF excited laser assembly can further include an RF feed-through assembly including a conductor extending through a port defined in a first electrode of the pair of opposed electrodes and across the inter-electrode gap within a discharge-free region defined by the pair of opposed electrodes, wherein the discharge-free region is accessible to a gas medium, but is located at a position in the inter-electrode gap where the gas medium is not excited, and wherein the conductor is electrically coupled to a second electrode of the pair of opposed electrodes and electrically isolated from the first electrode. The feed-through assembly can further include a metal sleeve around the conductor, wherein the metal sleeve is electrically coupled to the first electrode and spaced from the conductor to form a gap having a width sufficient to allow the formation of an ion sheath discharge barrier between the conductor and the metal sleeve. The feed-through assembly can further include a ceramic sleeve around the conductor to isolate the conductor from the first electrode. The conductor can include a water cooling port.

In some embodiments, the pair of opposed electrodes can be configured to define a discharge-free region in the inter-electrode gap, such that the discharge-free region is a region within the inter-electrode gap accessible to a gas medium but where the gas medium is not excited, the RF excited laser assembly further including a fully enclosed impedance component extending across the inter-electrode gap within the discharge-free region; such that the impedance component is electrically coupled to both electrodes. The impedance component can be a conical spiral inductor. The RF excited laser assembly can further include a metal cap and a metal clamp configured to secure the conical inductor to the laser assembly, the metal cap, the metal clamp, and the conical inductor forming an all metal inductor assembly. The conical spiral inductor can define an inter-winding spacing sufficient to mitigate ignition of the gas medium between windings. The impedance can be configured to conduct heat generated in the impedance towards at least one of the electrodes.

In some embodiments, the pair of opposed electrodes can include a first electrode and a second electrode, such that the electrodes are configured to define a discharge-free region in the inter-electrode gap, such that the discharge-free region is a region within the inter-electrode gap accessible to a gas medium but where the gas medium is not excited, the RF excited laser assembly further including: an RF feed-through assembly including a conductor extending through a port defined in the first electrode and across the inter-electrode gap within the discharge-free region, the conductor electrically coupled to the second electrode and electrically isolated from the first electrode. The feed-through assembly can further include a metal sleeve around the conductor, such that the metal sleeve is electrically coupled to the first electrode and spaced from the conductor to form a gap having a width sufficient to allow the formation of an ion sheath discharge barrier between the conductor and the metal sleeve. The feed-through assembly can further include a ceramic sleeve around the conductor to isolate the conductor from the first electrode. The conductor can include a water cooling port.

Particular embodiments of the subject matter described in this disclosure can be implemented so as to realize one or more of the following advantages. Implementations can produce more uniform discharge characteristics between opposing pairs of electrodes. Utilizing one or more termination bridges and/or providing alternatives to the use of dielectric material within the gas chamber as disclosed below can improve the reliability, reduce part count, and/or reduce the overall cost of the laser assembly. Using two termination bridges as disclosed below can further improve the rigidity of the laser assembly and in some cases, can simplify assembly and disassembly of the laser while maintaining the inter-electrode gap.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIGS. 2-4 are cross-sectional side views of RF excited lasers.

Like reference symbols in the various drawings indicate like elements.

DETAILED DESCRIPTION

FIGS. 2-16 illustrate various implementations of laser assemblies and sub-assemblies including one or more of the following features: (i) a radio frequency (RF) feed-through assembly configured to extend through a port in a first electrode to provide an RF bias to an opposing electrode, (ii) one or more impedances configured to be placed within a gas chamber defined by the laser assembly, and (iii) one or more metal bridge supports separating the electrodes and providing a termination impedance. These elements can be combined to provide all metal gas lasers, but also provide significant advantages when used by themselves or in various combinations of pairs of these features.

Figure 2:
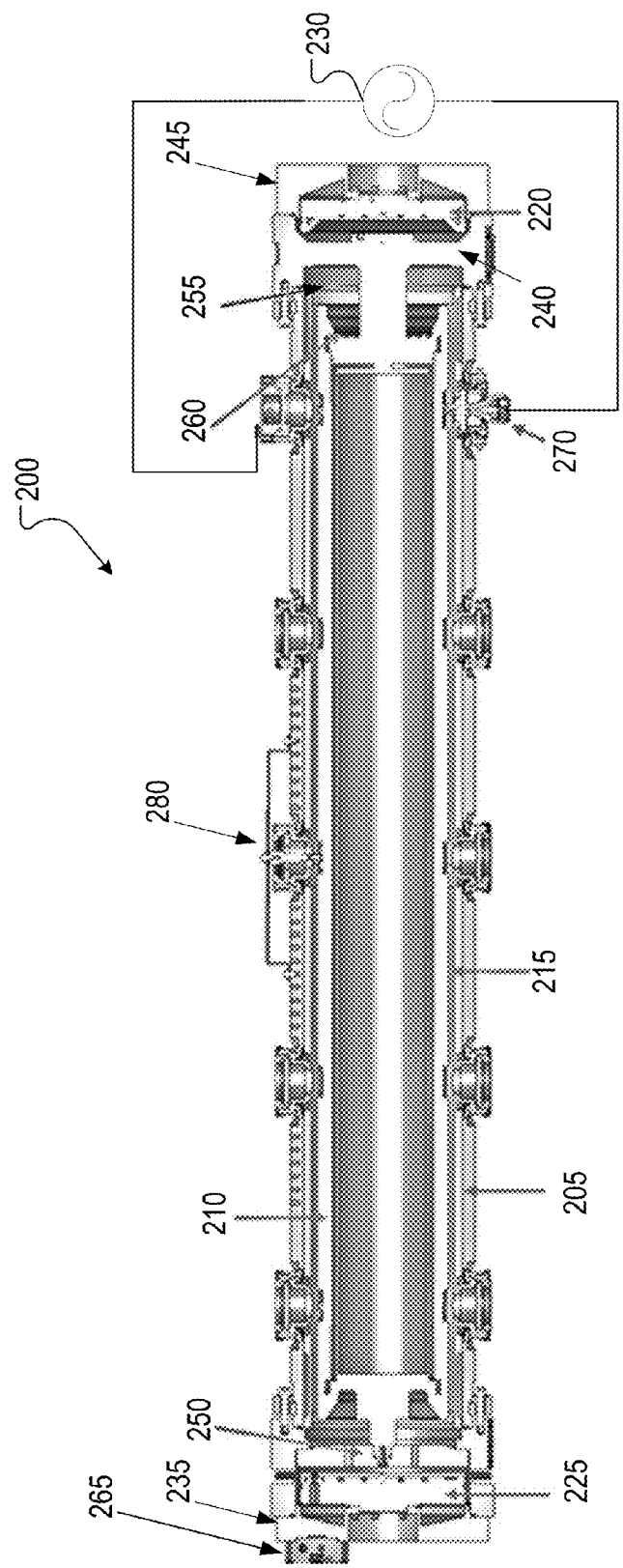

Referring to FIG. 2, an RF excited laser assembly 200 is illustrated including a pair of opposed electrodes 205, 210 defining an inter-electrode gap 215 that provides a discharge volume for excitation of a gas medium to electrically pump a laser. In this implementation, laser 200 has an annular geometry and includes two concentric electrodes. Electrode 205 is an outer cylindrical electrode 205 and electrode 210 is an inner cylindrical electrode 210 coaxially extending along an inner opening of outer electrode 205 to define the annular inter-electrode gap 215.

Laser 200 can be diffusion cooled by cooling one or more of electrodes 205, 210 (for example, the outer electrode 205) using a water cooling system. For example, the inner electrode can have a hollow cylindrical shape such as shown in FIGS. 2-4, and 7-10A or can have a solid cylindrical shape. In some implementations, the inner electrode includes a hollow core and channels formed within an interior surface of the electrode to provide a path for cooling water. Laser 200 can operate using a radio frequency (RF) excitation source that provides power to inner electrode 210 and to outer electrode 205. The optical resonator of laser 200 is formed by a front mirror, axicon 220, and a rear mirror, helix 225, and the two electrodes 205, 210. Thus, excitation of the laser gas takes place in the discharge volume (or RF field) between the electrodes. Helix 225 is mounted on a helix carrier 235 and axicon 220 is mounted on an axicon carrier 245. A laser exit window 265 is located on helix carrier 235. The resonator design produces a linearly polarized beam.

In one specific implementation, laser 200 is a carbon dioxide ($CO_2$) gas laser, which is a laser based on a gas medium that contains carbon dioxide ($CO_2$), helium (He), nitrogen ($N_2$), and possibly some hydrogen ($H_2$), water vapor, and/or xenon (Xe). The $CO_2$ gas laser 200 operating using an RF source 230 can emit at a wavelength from between about 9 to 11 μm, and in particular, at about 10.59 μm. The electrodes 205, 210 extend longitudinally, can have longitudinal lengths of about 1.3 m, diameters on the order of a couple hundred millimeters, and can define an inter-electrode gap 215 of about 6 mm at a pressure of, for example, about 70-90 millibars. The size of the gap 215 is related to the source frequency and the pressure within the gap 215; therefore, if a particular gap 215 size is needed, then the source frequency and pressure within the gap 215 can be adjusted accordingly. For example, if the gap size is decreased then the frequency of and the gap pressure are increased.

Figure 8:
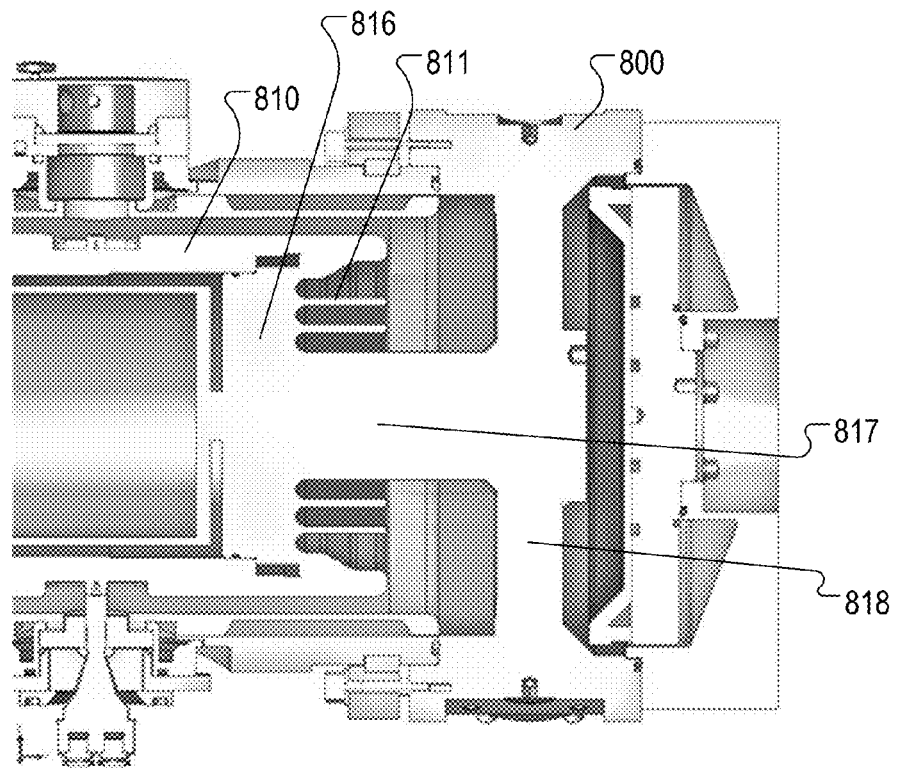

Electrodes 205, 210 are supported at both ends by conductive termination bridges 240, 250 without the use of dielectric material. Bridges 240 and 250 mechanically support and position the electrodes relative to each other. In addition, bridges 240 and 250 are shaped to obtain a desired termination impedance so as to improve the voltage distribution along the electrodes. In some implementations, the inner electrode 210 is fabricated with fins (e.g., fins 811 as shown in FIG. 8) at the axicon end 260 to provide a longer RF path and generate a larger voltage drop between the inner electrode 210 and the grounded outer electrode 205 at the axicon end. The fins can be configured to have a thickness of at least twice the skin depth at the excitation frequency, and preferably, many times thicker than the skin depth at the excitation frequency to ensure that the RF power signal travels the intended path length.

Figure 1A:
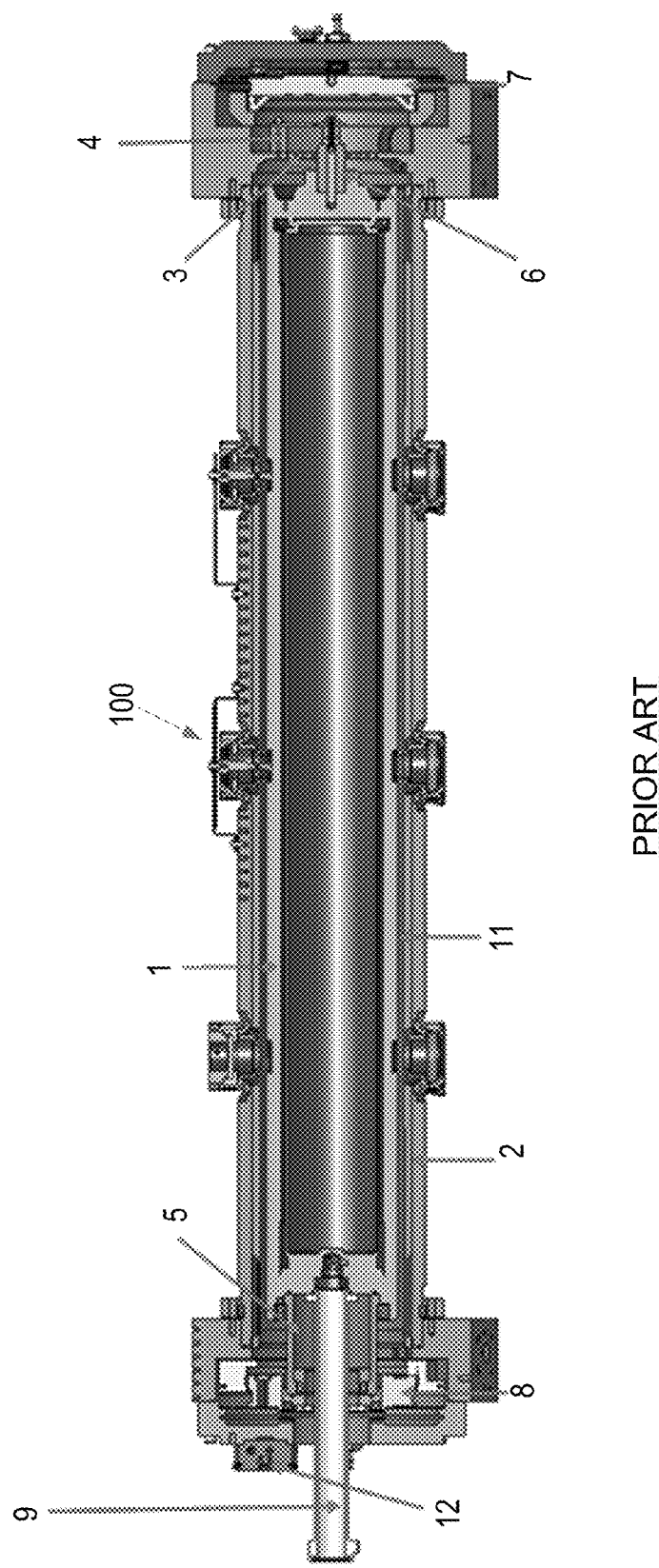
FIG. 1A is a cross-sectional side view of an RF excited laser.

In general, the impedance of each bridge provides a voltage drop at the corresponding end of inner electrode 210 to the grounded outer electrode 205 so as to facilitate ignition of the gas discharge and/or to maintain a uniform gas discharge. Shaping each bridge to have a desired impedance eliminates the need for a ceramic insert between the bridge and the inner electrode, thereby providing a more resilient and less complex sub-assembly. Similar benefits can be derived by replacing at least one support assembly in certain laser assemblies. For example, FIGS. 3 and 4 illustrate side cross-sectional views of RF excited laser assemblies 300, 400, each similar to laser 100 of FIG. 1A. In these implementations, lasers 300 and 400 include a conductive termination bridge 340, 440 providing mechanical support for inner electrode 310, 410 and a termination impedance between inner electrode 310, 410 and outer electrode 305, 405 at the axicon end. In this way, bridges 340 and 440 are electrically and mechanically coupled to inner electrode 310, 410 and outer electrode 305, 405 without the use of a ceramic insert (e.g., ceramic insert 6 of FIG. 1A). Bridges 340 and 440 can be implemented as shown in FIGS. 5-10F, for example.

Referring again to FIG. 2, the utilization of two conductive termination bridges for providing mechanical support to inner electrode 210 enables the removal of helix carrier 235 and axicon carrier 245 without affecting the spacing or alignment between inner electrode 210 and outer electrode 205. This can be particularly useful during the assembly process and/or when adjusting or replacing the mirrors.

Figure 5:
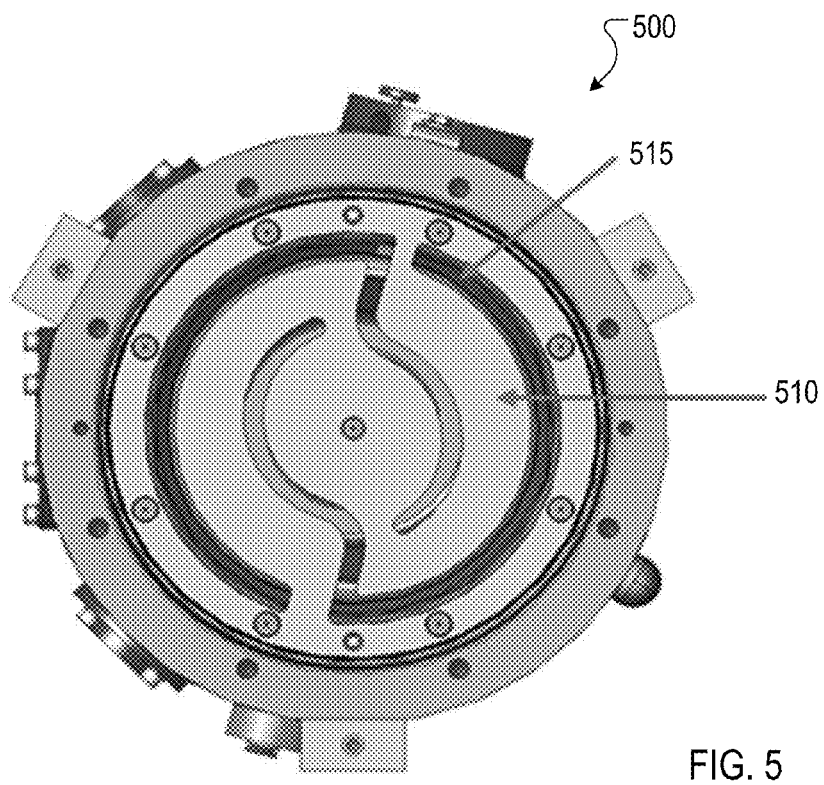
FIG. 5 is an end view of an RF excited laser including a spiral termination bridge.

FIGS. 5-10F illustrate various implementations of conductive termination bridges including planar, spiral-shaped bridges 500, 600, planar, zig-zag shaped bridge 650, and T-shaped bridges 700, 800, 900. FIG. 5 is an end-view of a laser assembly and illustrates a termination bridge 500 shaped like a double spiral or an Archimedean spiral and the inter-electrode gap 515. The impedance of termination bridge 500 is tuned by the number of turns of each spiral branch 510, the thickness of the structure, and the cross-section of the void formed between the outer electrode, the inner electrode, and the bridge (for example, void 255 in FIG. 2). The distance between the helix mirror and the termination bridge also affects the impedance value and can be used as fine adjustment. However, if this distance is kept fixed, one can vary other parameters to keep the same optical resonator (i.e., by maintaining the distance between the helix and axicon mirrors).

Figure 6A:
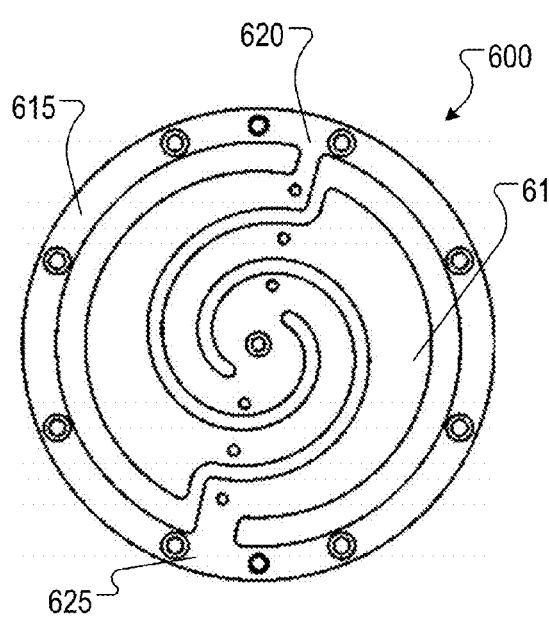
FIGS. 6A and 6B are illustrations of two additional examples of a termination bridge.
Figure 6B:
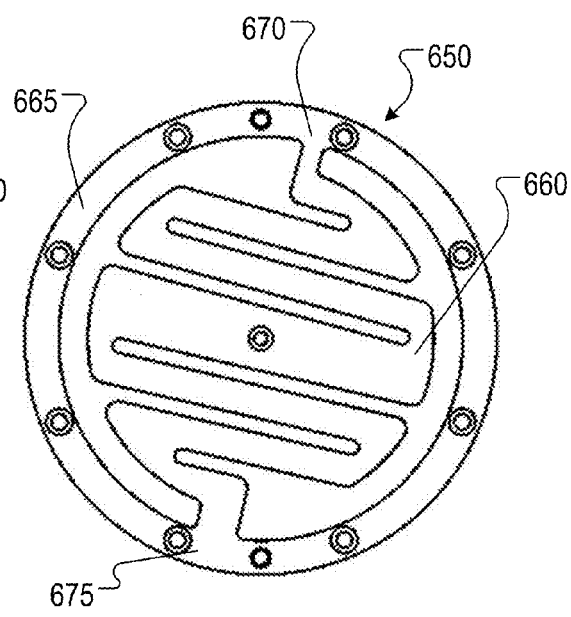

Fermat's spirals or logarithmic spirals can also be used to achieve the desired impedance and mechanical support. Other forms can also be used to achieve a desired amount of mechanical stability/rigidity, strength, and/or impedance. For example, FIGS. 6A and 6B illustrate two additional implementations of a planar termination bridge having different forms. Termination bridge 600 is another double-spiral termination bridge including two spiral branches 610 forming an increased number of windings compared to the implementation provided in FIG. 5. FIG. 6B illustrates a termination bridge 650 having a parallel zig-zag branch. As with the termination bridges shown in FIG. 5, the branches 610, 660 terminate at diametrically opposed locations 620/625, 670/675 along the circumference of outer ring 615, 665. The spacing between branches 610, 660 and outer ring 615, 665 is configured to provide little or no interference with the optical resonator (i.e., the width of the void formed between branches 610, 660 and outer ring 615, 665 is greater than the inter-electrode gap formed between the inner electrode and the outer electrode when assembled). Other implementations can include a single spiral branch provided that mechanical stabilization is provided by other means. For example, distributed metal impedances such as the internal conical-spiral-inductor disclosed herein can be used to support the inner electrode and maintain the inter-electrode gap.

The overall impedance of the termination bridges provided in FIGS. 6A and 6B are tuned by the geometric shape, thickness, and resistivity of branches 610, 660, as well as the cross-section of the void formed between the outer electrode, the inner electrode, and the bridge. As described with respect to FIG. 5, the distance between the helix mirror and the termination bridge also affects the impedance value and can be used as fine adjustment.

Figure 7:
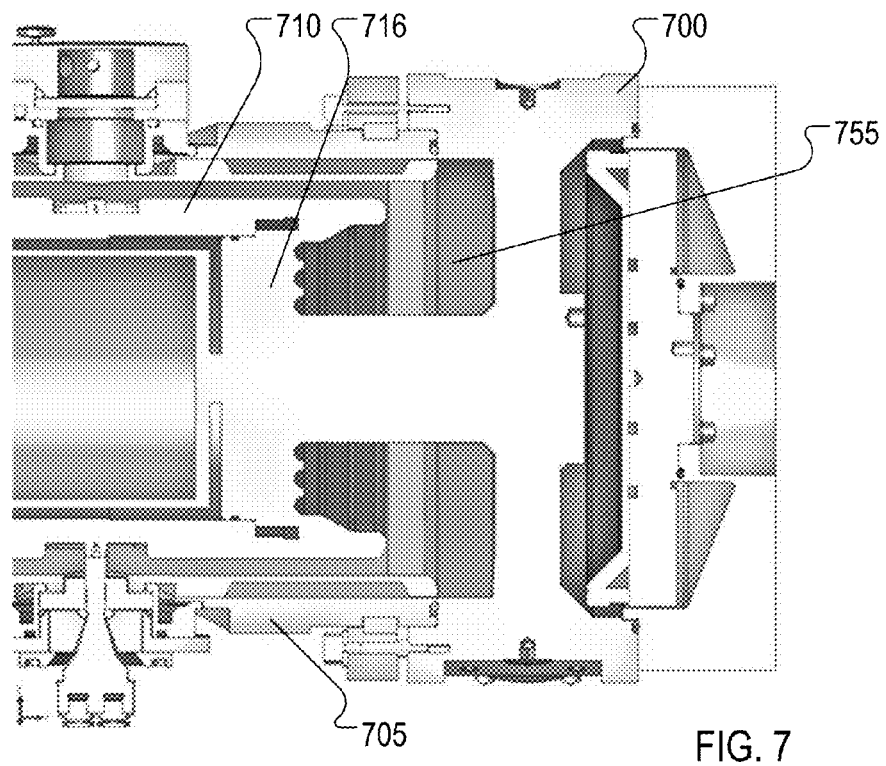
FIGS. 7-9 are cross-sectional side views of T-shaped termination bridge examples.

FIGS. 7-10A are cross-sectional views of examples of various T-shaped termination bridges. Such T-shaped termination bridges can be attached to the inter electrode or integrally formed (e.g., welded or molded) with the inner electrode to form a continuous assembly/component. For example, FIG. 7 shows a termination bridge 700 welded to an end cap 716 of inner electrode 710. The termination impedance is determined by the thickness of the structure, and the cross-section of the void 755 formed between the outer electrode 705, the inner electrode 710, and the bridge 700. End cap 716 may optionally be formed together or attached with bridge 700 prior to being welded or attached to inner electrode 710.

FIG. 8 illustrates a T-shaped bridge 800, e.g., that can be integrally formed with an inner electrode 810 having multiple concentric fins 811. Termination bridge 800 includes an inner electrode contact 816 that is welded to inner electrode 810. Inner electrode contact 816 can be formed as an end cap to inner electrode 810 as described in FIG. 10C with respect to inner electrode 1010, as part of the inner electrode 810, or as part of the termination bridge as described herein Inner electrode contact 816, support column 817, and cross-brace 818 can be molded, welded, and/or bolted together to form termination bridge 800. As described above, each fin preferably has a thickness greater than twice the skin depth of the inner electrode at a frequency of the RF potential applied across the inner and outer electrodes. Some implementations can include a fewer number or a greater number of fins so as to achieve the desired impedance.

Figure 9:
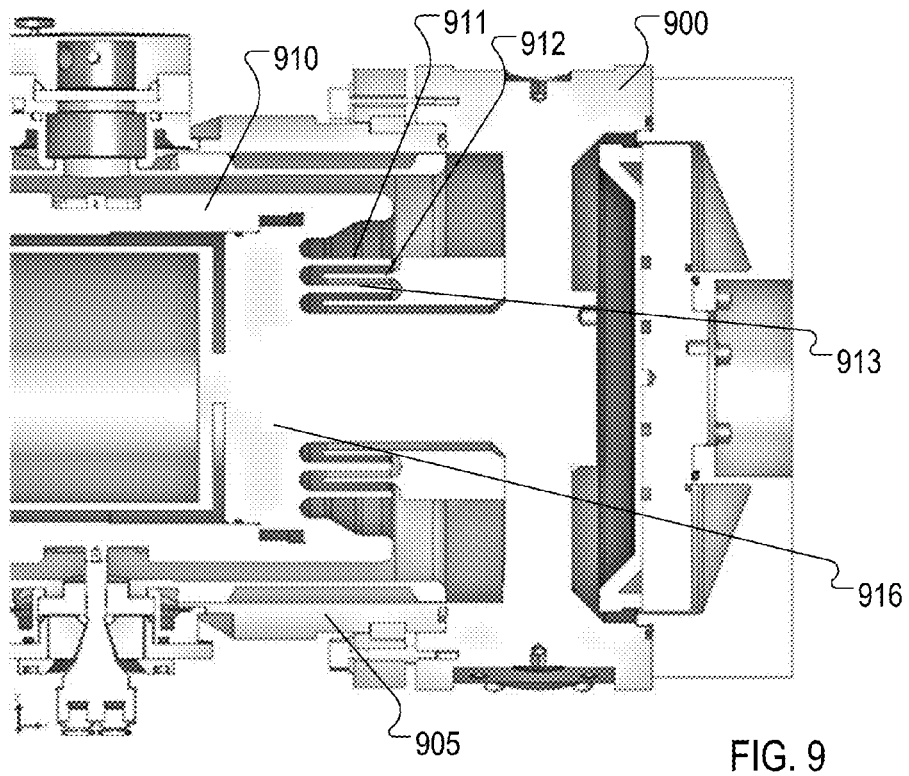

FIG. 9 illustrates a T-shaped bridge 900 including complementary concentric fins 912 arranged so as to form, in combination with the fins 911 provided on the inner electrode 910 (e.g., on an end cap 916) and the laser gas medium introduced into the space between the fins as the dielectric, a capacitive structure 913. In this way, a capacitive termination can be achieved between the inner electrode 910 and the outer electrode 905.

Figure 10A:
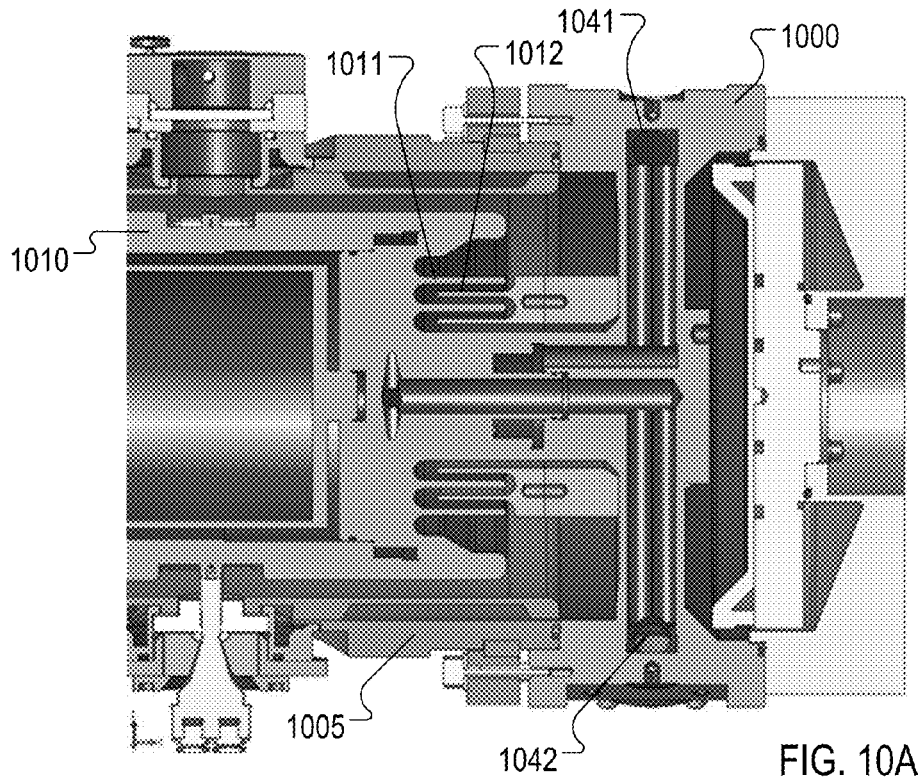
FIGS. 10A-10F are cross-sectional, perspective, and side views of a T-shaped termination bridge and an inner electrode with complementary fin structures.
Figure 10B:
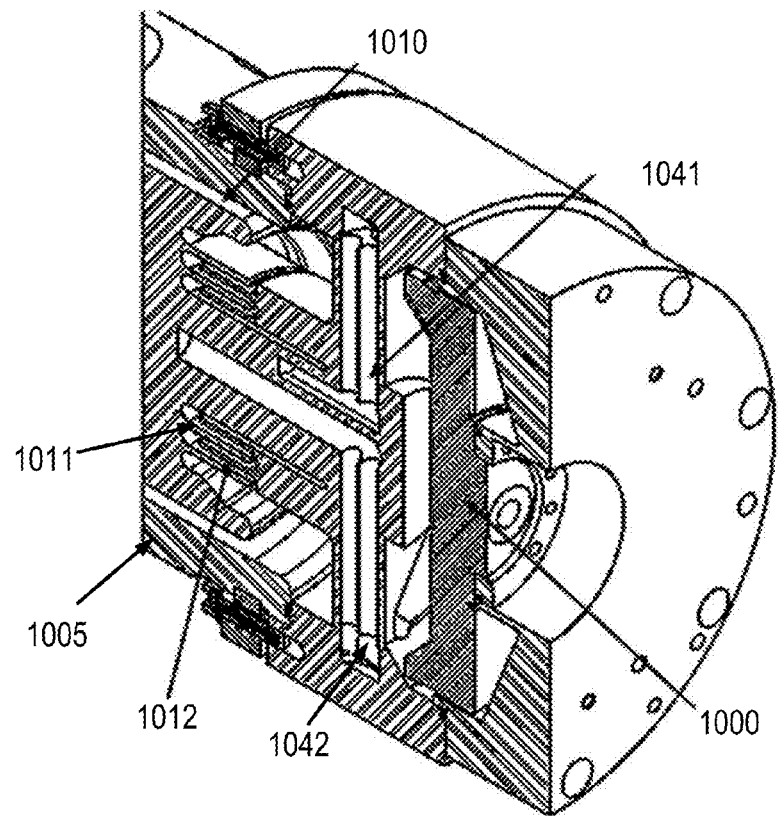
Figure 10C:
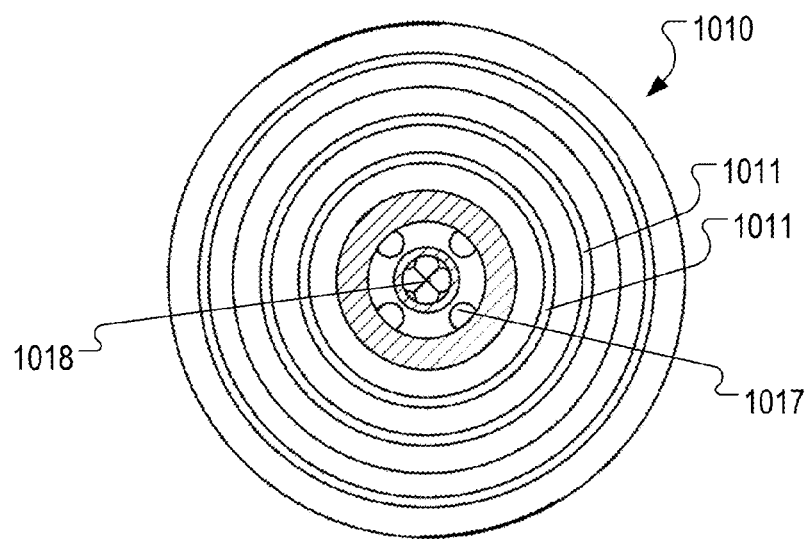
Figure 10D:
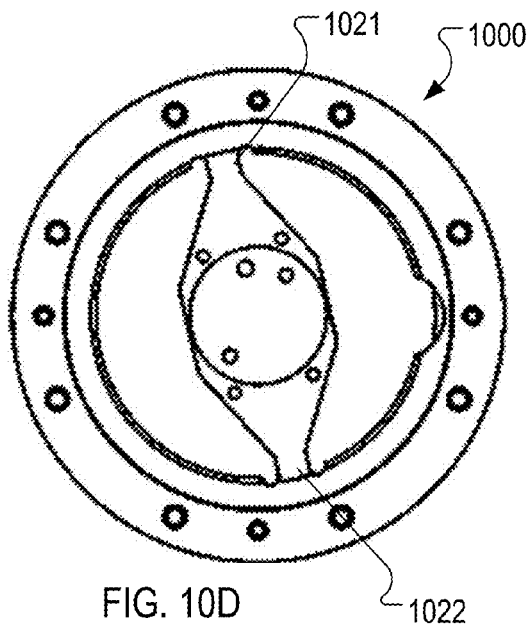
Figure 10E:
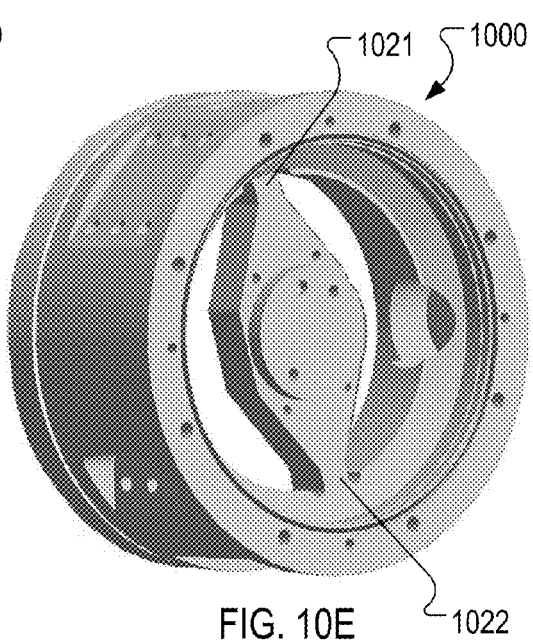
Figure 10F:
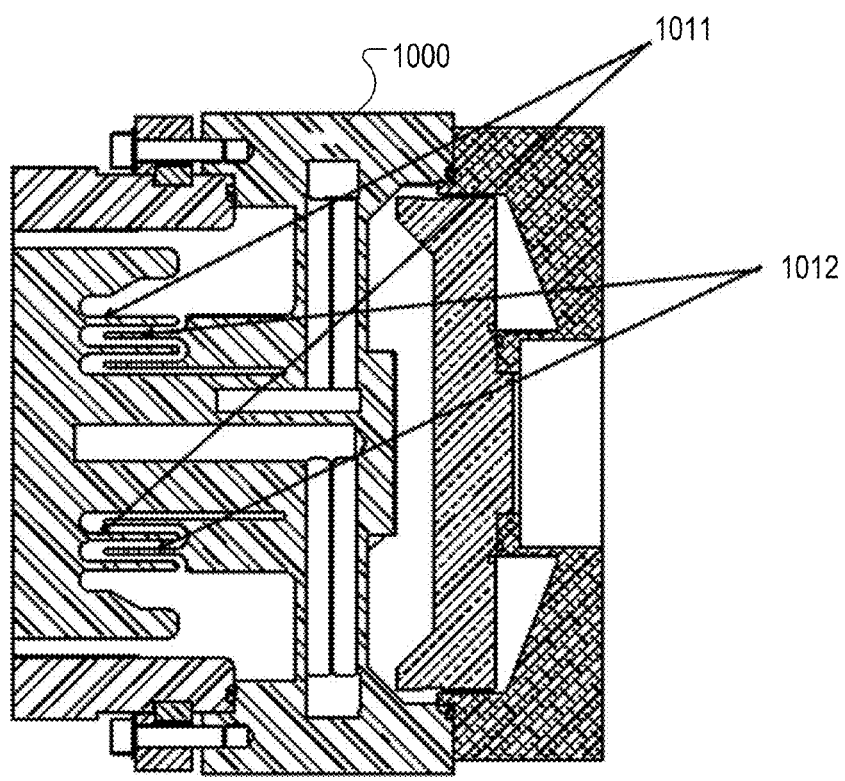

FIGS. 10A-10F illustrate cross-sectional, side, and perspective views of a T-shaped termination bridge 1000 including a capacitive structure formed by inner electrode fins 1011 and bridge fins 1012. Termination bridge 1000 also includes internal channels 1041, 1042 for the supply and return of cooling fluids for the inner electrode. Internal channels 1041 and 1042 can optionally be included in other implementations, including, for example, those illustrated in FIGS. 7 to 9. Internal channels 1041 and 1042 in the T-shaped bridge implementations provide an alternative to utilizing an RF feed-through at the helix end of the laser for the supply and return of cooling fluids for the inner electrode, as shown in FIGS. 1, 3, and 4. FIG. 10C provides an end-view of inner electrode 1010 including fins 1011. FIG. 10C also shows inner electrode supply and return paths for the cooling fluid provided by the channels 1041, 1042 of bridge 1000. FIGS. 10D-10E provide front and perspective views of termination bridge 1000 including diametrically opposed electrode support extensions 1021, 1022 and outer support ring 1023. Outer support ring 1023 is mechanically coupled to the outer electrode to provide a return path to ground. FIG. 10F is a cross-sectional side view of termination bridge 1000 and fins 1011, 1012 as described herein.

Figure 11:
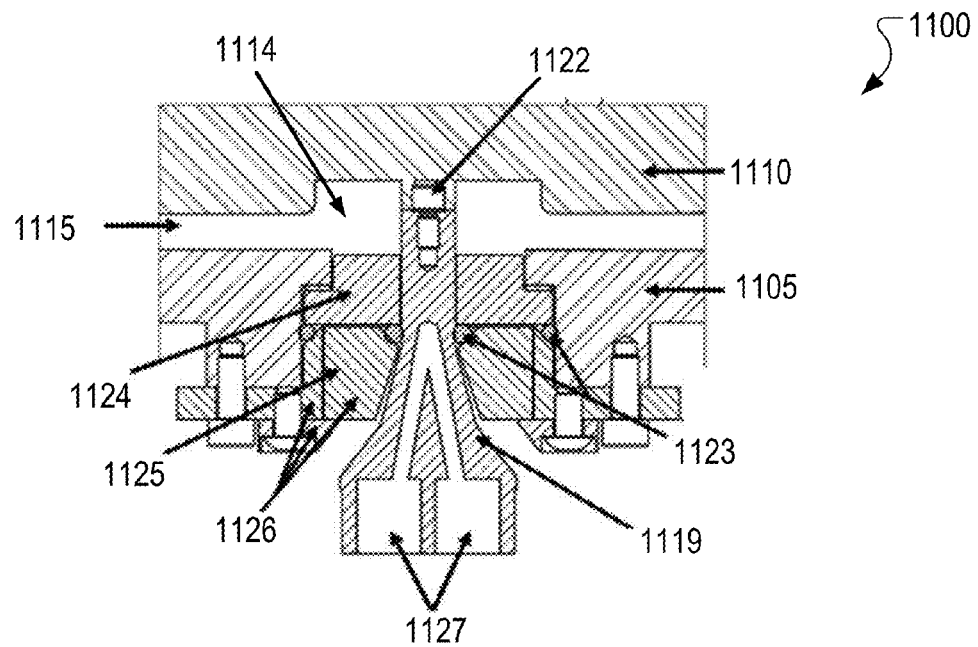
FIGS. 11 and 12 are cross-sectional side views of RF feed-through assemblies.
Figure 12:
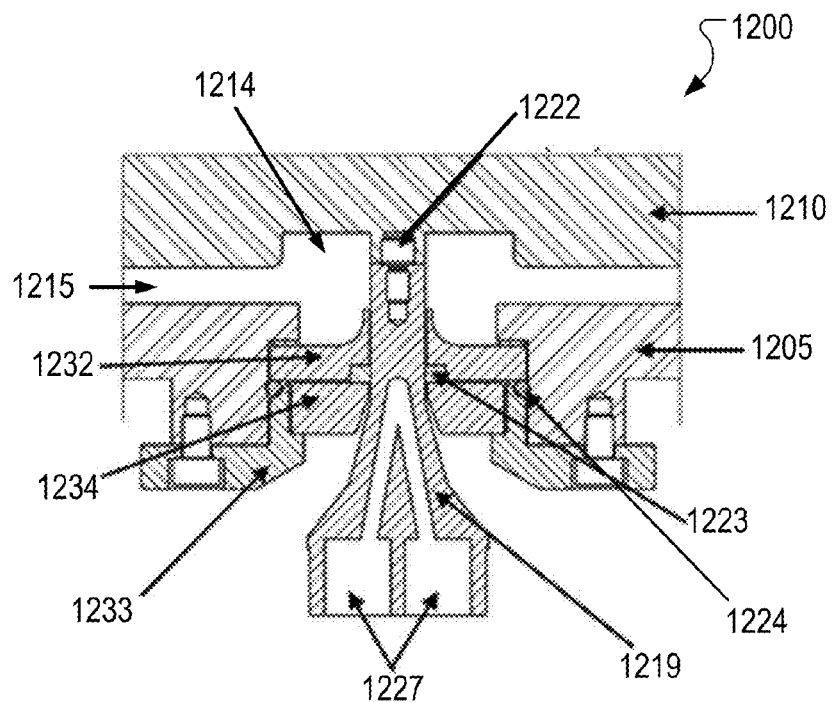

In some implementations, RF power is supplied to an inner electrode by means of the feed-through conductor that connects to the inner electrode through an opening or port defined in an outer electrode. For example, FIG. 2 illustrates an RF feed-through assembly 270 arranged close to the axicon end 260 of laser 200. FIGS. 11 and 12 illustrate two examples of an RF feed-through assembly in further detail. In these examples, RF power is injected directly into a discharge gap 1115, 1215 in a region where discharge and laser action are inhibited (i.e., a discharge-free region 1114, 1214). The discharge free region 1114, 1214 is formed by varying the size of the inter-electrode gap 1115, 1215. In the examples illustrated in FIGS. 11 and 12, the distance between the inner surface of the outer electrode 1105, 1205 and the outer surface of the inner electrode 1110, 1210 (that is, adjacent surfaces of the electrodes 1105/1110, 1205/1210) in and/or near the discharge-free region 1114, 1214 is large enough to prevent or inhibit plasma discharge between the outer electrode 1105, 1205 and the inner electrode 1110, 1210 within the discharge-free region 1114, 1214 (thus, the plasma cannot ignite within the discharge-free region 1114, 1214).

On the other hand, the distance between adjacent surfaces of the electrodes 1105/1110, 1205/1210 outside of the discharge-free region 1114, 1214 is small enough to promote plasma discharge between the outer electrode 1105, 1205 and the inner electrode 1110, 1210 within the discharge volume (the volume outside of the discharge-free region 1114, 1214). In other words, the gap 1115, 1215 between the electrodes 1105/1110, 1205/1210 within the discharge-free region 1114, 1214 is greater than the gap 1115, 1215 between the electrodes 1105/1110, 1205/1210 within the discharge volume such that a discharge is prevented from occurring in the discharge-free region 114, 1214. The discharge-free region 1114, 1214 is defined so as to avoid overheating of the feed-through conductor and arcing in close proximity to the conductor.

The electric field distribution in the RF feed-through region at point of discharge ignition is calculated by numerically solving the Laplace differential equation. The dimensions such as the dielectric disc diameter and the inner electrode spot face are calculated to avoid high local electric field strengths, which might lead to arc formation. The opening of the discharge gap in transition to the discharge free region (spot face) has a shape of a clothoid, where the radius of curvature is continuously increasing from infinity at the discharge gap to some finite curvature.

The RF feed-through assembly of FIG. 11 includes a feed-through conductor 1119 that is insulated from outer electrode 1110 by means of an alumina ceramic insulator 1124 and an insulating clamp 1125, and is connected to inner electrode 1110 by a screw 1122. Insulator 1124 covers the feed-through conductor 1119 until about 2 mm before entering the discharge gap region 1115, thereby inhibiting a discharge between the feed-through conductor 1119 and the walls of the port defined by outer electrode 1110, which is connected to ground return by means of a clamp assembly 1126. The port for RF feed-through conductor 1119 is sealed for vacuum by clamping the O-rings 1123 as shown in FIG. 11. RF feed-through conductor 1119 includes an optional supply and return cooling port 1127 defined by inner walls of the conductor.

In some embodiments, other insulator materials can be used in the feed-through assembly instead of alumina, but all such materials should meet the following criteria: preferably lower dielectric constant than alumina, heat resistant (mechanically and chemically stable at temperatures of ~700 centigrade), and no outgassing. A material with lower dielectric constant than alumina can be desirable to minimize the risk of running a discharge between the feed-through and the walls of the port at the outer electrode.

In some implementations, the feed-through assembly does not require the use of a dielectric material to insulate the feed-through conductor from the grounded outer electrode. FIG. 12 provides an example of such an embodiment. Embodiments such as that shown in FIG. 12 utilize the thickness of the ion sheath formed in the gas at the boundaries of the metal surface to isolate feed-through conductor 1219 from the grounded outer electrode 1210.

The separation between the feed-through conductor 1219 and the grounded wall of the outer electrode port should be smaller than the ion sheath. In some configurations, the ion sheath is on the order of 400 µm for a 27.12 MHz excitation frequency. In the example of FIG. 12, feed-through conductor 1219 is connected to inner electrode 1210 by screw 1222 and is covered by a grounded metal sleeve 1232 spaced from the feed-through conductor to form a gap between feed-through conductor 1219 and metal sleeve 1232 that is comparable to the ion sheath thickness. Metal sleeve 1232 is centered to feed-through conductor 1219 by a compressed O-ring 1223, which also serves as a vacuum seal between them. Another O-ring 1224 is used to seal between metal sleeve 1232 and the port defined by outer electrode 1210. The O-rings 1223, 1224 are compressed by the ground return clamp 1233 and the insulating clamp 1234. RF feed-through conductor 1219 includes an optional supply and return cooling port 1227 defined by inner walls of the conductor.

Figure 1B:
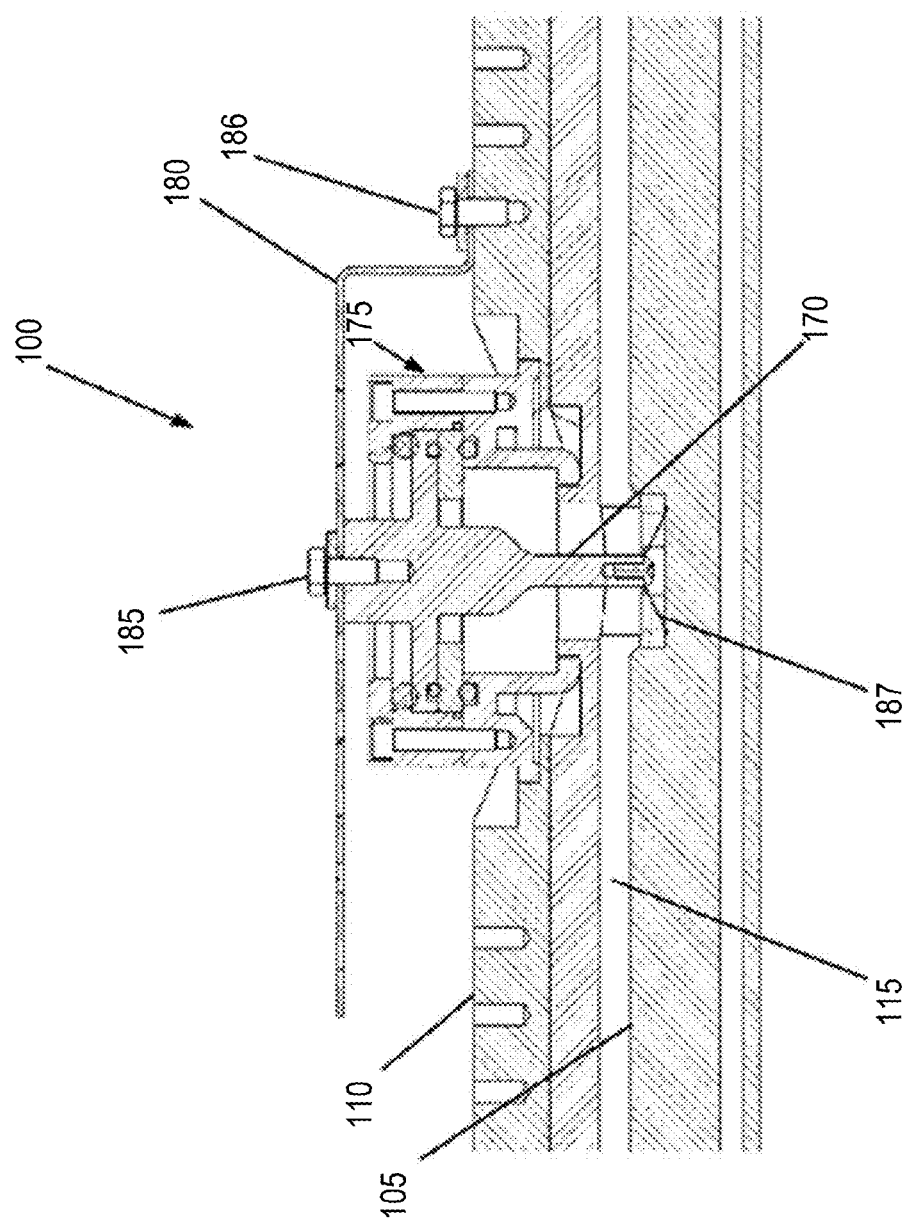
FIG. 1B is a cross-sectional side view of an externally adjustable inductance.

When a discharge is established, the power density in the discharge typically varies along the electrodes following the voltage variation in the transmission line. However, it is generally desirable to keep the discharge uniform along the gap. In some implementations, discharge uniformity can be improved by using one or more of the termination bridges described above with regard to FIGS. 2-10F. In some implementations, a uniform discharge can be achieved by using one or more termination bridges as described above in combination with one or more impedances distributed along the length of the inter-electrode gap 215. Referring again to FIG. 2, the distributed impedances provided by termination bridges 240 and 250, a center impedance 280 help to maintain a uniform discharge along gap 215. In the example of FIG. 2, center impedance 280 is in the form of an inductor that can be externally adjusted. FIG. 1B illustrates an example of an externally adjustable inductor assembly 100 as disclosed in U.S. Pat. No. 7,778,303.

Figure 13:
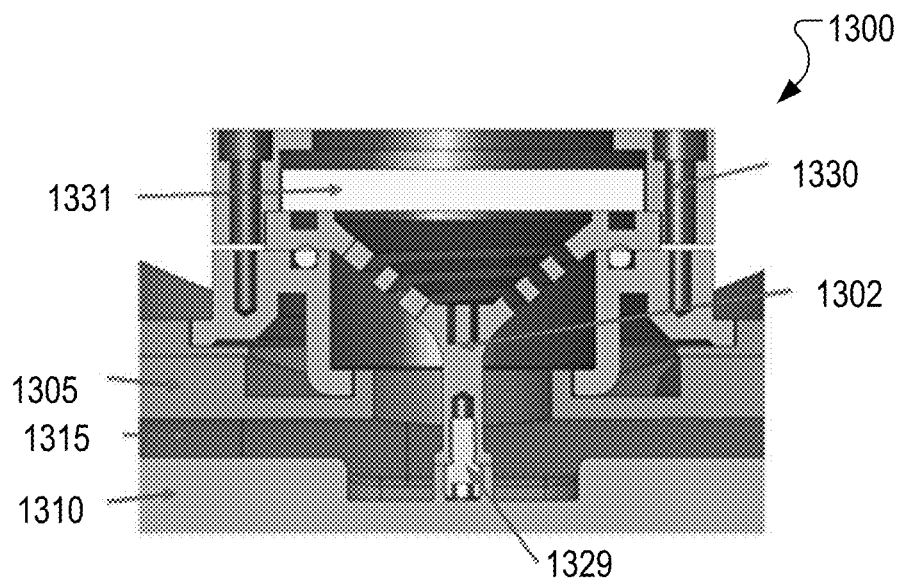
FIG. 13 and FIG. 14 are cross-sectional side views of an internal impedance component in the form of an inductor.

Providing an externally adjustable impedance between the helix and axicon ends of laser 200 permits a discharge distribution that has a typical maximum over minimum ratio of <1.5 times at full RF input power. In some implementations, the impedance characteristics necessary to achieve the desired discharge performance are determined, for example, empirically, by calculation, or by simulation, and are utilized to provide one or more fixed impedance components positioned within the gas chamber. FIG. 13 illustrates an example of a fixed inductor assembly 1300 including an inductor 1302 shaped as a conical spiral that can be contained fully inside the gas chamber. For example, the elongation of the conical spiral is chosen to mitigate ignition of the gas medium in the space between the windings.

In some examples, inductor 1302 is made of metal with high electrical and thermal conductivity. Preferably, the cross-section of the winding should be thick enough to conduct the heat generated in the inductor towards at least one electrode. Inductor 1302 can be connected across the discharge gap 1315 to the inner electrode 1310 by means of a screw 1329 and to the grounded outer electrode 1305 by clamping it down with a metal clamp 1330. A viewport 1331 could be installed to monitor the discharge characteristics. Alternatively, a metal cap can be used in place of a viewport 1331 such that the metal cap, metal clamp 1330, and inductor 1302 form an all metal inductor assembly.

Figure 14:
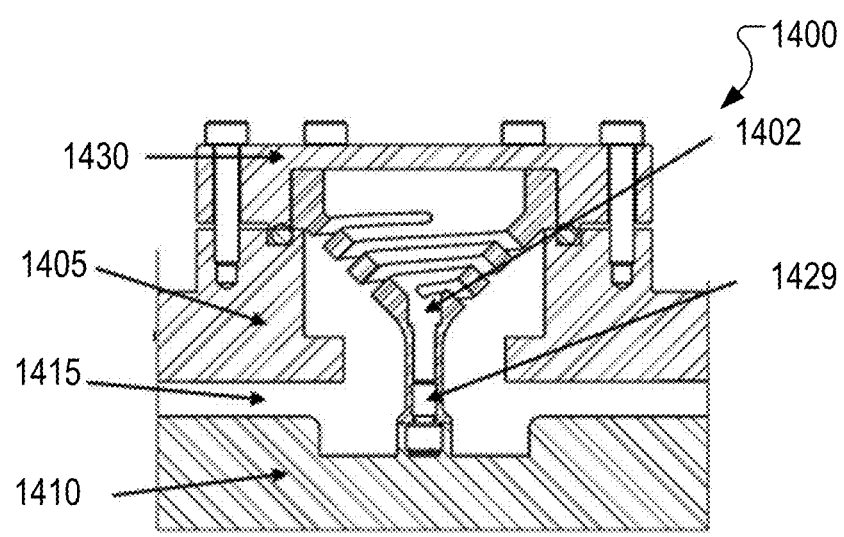

FIG. 14 illustrates another implementation of a fixed inductor assembly 1400 including an inductor 1402 shaped as a conical spiral. Inductor 1402 can be connected across the discharge gap 1415 to inner electrode 1410 by a screw 1429 and to the grounded outer electrode 1405 by clamping it down with a metal clamp/cap 1430. The use of metal clamp/cap 1430 in place of a viewport (shown in FIG. 13) provides an all metal inductor assembly.

Figure 15A:
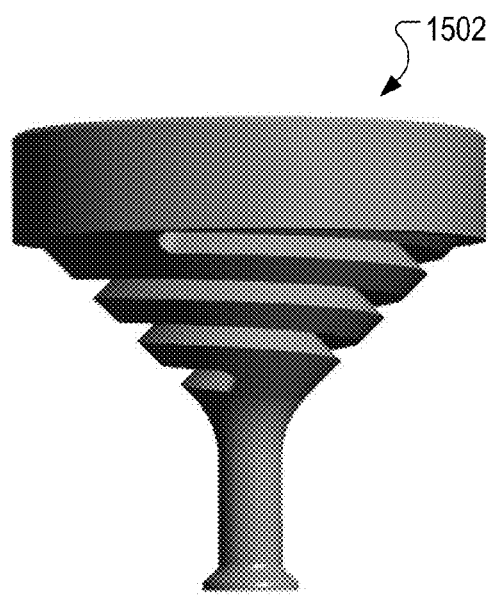
FIG. 15A is a perspective side view of a conical spiral inductor.
Figure 15B:
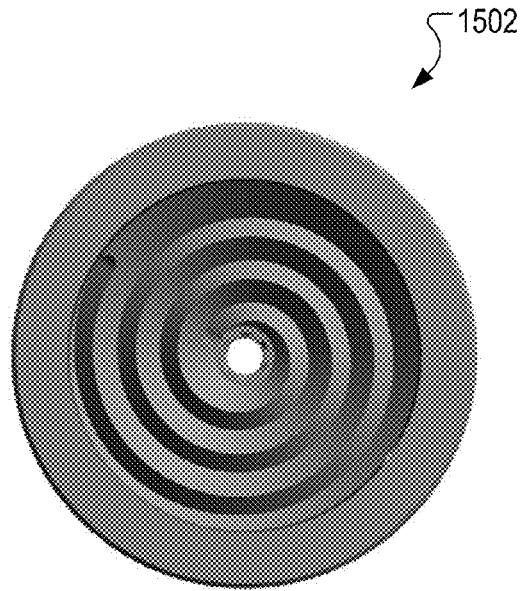
FIG. 15B is a perspective top view of a conical spiral inductor.

FIGS. 15A and 15B provide a perspective side view and a top view, respectively, of a conical spiral inductor 1502 in accordance with the above description. Inductor 1502 is configured to be contained fully inside the gas chamber. The elongation of the conical spiral is chosen to prevent the ionization of the gas in the space between the windings. Inductor 1502 is made of metal with high electrical and thermal conductivity and the cross section of the winding should be thick enough to conduct the heat generated towards tone or more electrodes, which are preferably diffusion cooled. Inductor 1502 is configured to be connected across the discharge gap to the inner electrode by means of a screw and to the grounded outer electrode by clamping it down with a clamp. As such, the dimensions of the inductor are generally selected to match the ports defined in an outer electrode and to provide the desired impedance, which can be determined by simulation or empirically.

Figure 16:
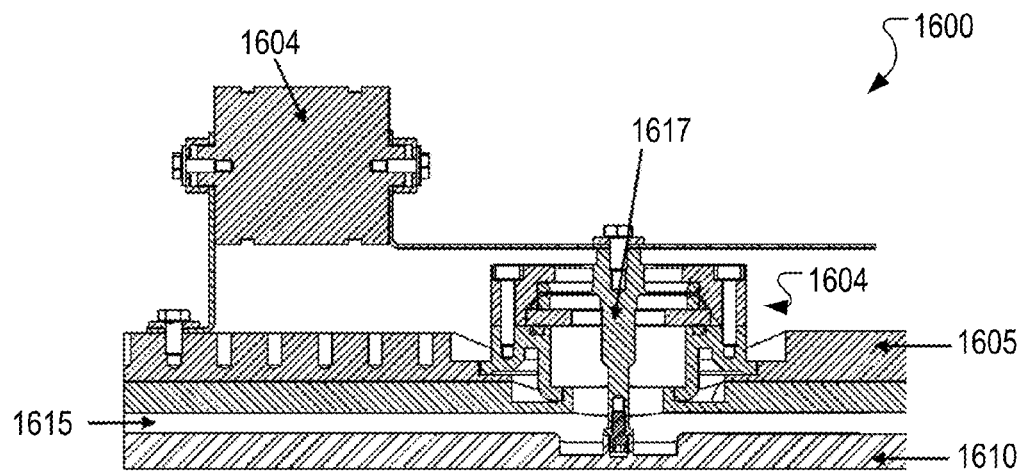
FIG. 16 is a cross-sectional side view of an external impedance component in the form of a capacitor.

FIG. 16 illustrates one example of an external impedance assembly 1600 including a capacitor 1604 electrically connected between outer electrode 1605 and feed-through conductor 1617 as part of a feed-through assembly 1604. In some implementations, one or more capacitive assemblies are positioned within the gas chamber. Various shapes and dimensions are possible for forming a capacitive structure, including, for example, inter-digitated structures, complementary concentric ring plates (as described above with regard to termination bridge 1000), and planar electrode structures. Implementations can include a conductive rod extending through the inter-electrode gap to a distance less than the thickness of the ion sheath formed in the gas at the boundaries of the metal surface so that conductive rod is isolated from the inner electrode. Alternative implementations can include capacitive structures utilizing a dielectric such as an alumina ceramic insulator or other insulator material meeting the criteria specified above for insulating feed-through conductor 1119 in the RF feed-through assembly. Additional details regarding the feed-through assembly 1604, as well as alternative implementations, are provided herein with respect to FIGS. 1B, 13, and 14.

In general, the input and output power of the laser can vary. The lasers disclosed herein can work with RF input power of between 10 kW and 50 kW to produce a laser output between 1 kW and 5 kW. In some embodiments, the laser assemblies can be configured to operate at other power levels by appropriately scaling the dimensions of the laser assembly.

Various implementations of the laser assemblies disclosed herein do not use insulator materials between the two electrodes. For example, implementations incorporating a termination bridge as described herein provide rigid electrically conductive assemblies instead. While the dual termination between the outer electrode and the inner electrode would behave like a short circuit connection in the low frequency domain, the termination bridges described herein actually provide a termination impedance for an RF potential applied to the electrodes. The internal impedances described above in combination with axicon end and helix end termination bridges make it possible to provide an all-metal coaxial laser assembly.

In operation, laser discharge generation is accomplished by providing a pair of opposed electrodes defining an inter-electrode gap; providing a conductive termination bridge in electrical contact with both electrodes, such that the conductive termination bridge mechanically supports and positions the electrodes relative to each other and provides a termination impedance for an RF potential applied to the electrodes; and applying an RF potential to the electrodes to generate a laser discharge within the inter-electrode gap. In some implementations, the electrodes can include a first electrode and a second electrode, and such that the electrodes are configured to define a discharge-free region in the inter-electrode gap, and such that the discharge-free region is a region within the inter-electrode gap accessible to a gas medium but where the gas medium is not excited. In such implementations, the laser discharge is generated by further providing an RF feed-through assembly including a conductor and a metal sleeve, the conductor extending through a port defined in the first electrode, through the metal sleeve, and across the inter-electrode gap within the discharge-free region, wherein the conductor is electrically coupled to the second electrode, and forming an ion sheath discharge barrier between the conductor and the metal sleeve to electrically isolate the conductor from the first electrode.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A radio frequency (RF) excited laser assembly comprising:
 a pair of opposed electrodes defining an inter-electrode gap, each electrode extending from a first end to a second end and comprising a first end face at the first end and a second end face at the second end; and
 first and second conductive termination bridges, the first termination bridge in electrical contact with the first end faces of both electrodes and spanning the inter-electrode gap at the first end, and the second termination bridge in electrical contact with the second end faces of both electrodes and spanning the inter-electrode gap at the second end, wherein each termination bridge mechanically supports and positions the electrodes relative to each other and provides a termination impedance for an RF voltage applied to the electrodes.

2. The laser assembly of claim 1, wherein the electrodes are concentric electrodes including an inner electrode and an outer electrode, and wherein the electrodes define an annular inter-electrode gap.

3. A radio frequency (RF) excited laser assembly comprising:
 a pair of opposed electrodes defining an inter-electrode gap; and
 a conductive termination bridge in electrical contact with both electrodes, wherein the termination bridge mechanically supports and positions the electrodes relative to each other and provides a termination impedance for an RF voltage applied to the electrodes, wherein the inner electrode comprises one or more concentric fins adjacent to the termination bridge, and wherein the one or more concentric fins each have a thickness greater than twice the skin depth of the inner electrode at a frequency of the RF voltage.

4. The laser assembly of claim 3, wherein the termination bridge comprises one or more complementary concentric fins, and wherein the one or more concentric fins and the one or more complementary concentric fins are arranged to form a space that in use can be filled with a dielectric gas to form a capacitor.

5. The laser assembly of claim 1, wherein the termination bridge is a planar, multi-spiral-shaped bridge.

6. The laser assembly of claim 1, wherein the termination bridge is a planar, Archimedean-spiral-shaped bridge.

7. The laser assembly of claim 1, wherein at least one of the first and second termination bridges is a T-shaped bridge integrally formed with one of the electrodes.

8. The laser assembly of claim 1, wherein the termination bridge is a first termination bridge, and the RF excited laser assembly further comprises a second termination bridge at an end opposite the first termination bridge.

9. The laser assembly of claim 8, wherein the first termination bridge is a planar, double-spiral-shaped bridge and the second termination bridge is a T-shaped bridge integrally formed with one of the electrodes.

10. The laser assembly of claim 1, wherein at least one of the first and second termination bridges defines a cooling fluid supply path and a cooling fluid return path.

11. The laser assembly of claim 1, wherein the RF excited laser assembly further comprises a fully enclosed impedance component extending across the inter-electrode gap within a discharge-free region defined by the pair of opposed electrodes, wherein the discharge-free region is accessible to a gas medium, but is located at a position in the inter-electrode gap where the gas medium is not excited.

12. The laser assembly of claim 11, wherein the impedance component is a conical spiral inductor.

13. The laser assembly of claim 12, wherein the RF excited laser assembly further comprises a metal cap and a metal clamp configured to secure the conical inductor to the laser assembly, wherein the metal cap, the metal clamp, and the conical inductor together form an all-metal inductor assembly.

14. The laser assembly of claim 13, wherein the conical spiral inductor defines an inter-winding spacing sufficient to mitigate ionization of a gas medium between windings.

15. The laser assembly of claim 11, wherein the impedance component is configured to conduct heat generated in the impedance component towards at least one of the electrodes.

16. The laser assembly of claim 1, wherein the RF excited laser assembly further comprises an RF feed-through assembly comprising a conductor extending through a port defined in a first electrode of the pair of opposed electrodes and across the inter-electrode gap within a discharge-free region defined by the pair of opposed electrodes, wherein the discharge-free region is accessible to a gas medium, but is located at a position in the inter-electrode gap where the gas medium is not excited, and wherein the conductor is electrically coupled to a second electrode of the pair of opposed electrodes and electrically isolated from the first electrode.

17. The laser assembly of claim 16, wherein the feed-through assembly further comprises a metal sleeve around the conductor, wherein the metal sleeve is electrically coupled to the first electrode and spaced from the conductor to form a gap having a width sufficient to allow the formation of an ion sheath discharge barrier between the conductor and the metal sleeve.

18. The laser assembly of claim 16, wherein the feed-through assembly further comprises a ceramic sleeve around the conductor to isolate the conductor from the first electrode.

19. The laser assembly of claim 16, wherein the conductor comprises a water cooling port.

20. A method of generating a laser discharge, the method comprising:
providing a pair of opposed electrodes defining an inter-electrode gap, each electrode comprising an end face;
providing a conductive termination bridge in electrical contact with the end face of both electrodes, wherein the conductive termination bridge mechanically supports and positions the electrodes relative to each other and provides a termination impedance for an RF voltage applied to the electrodes; and
applying an RF voltage to the electrodes to generate a laser discharge within the inter-electrode gap.

21. The method of claim 20 wherein the electrodes include a first electrode and a second electrode, the method further comprising:
providing an RF feed-through assembly comprising a conductor and a metal sleeve, the conductor extending through a port defined in the first electrode, through the metal sleeve, and across the inter-electrode gap within a discharge-free region, the conductor electrically coupled to the second electrode; and
forming an ion sheath discharge barrier between the conductor and the metal sleeve to electrically isolate the conductor from the first electrode;
wherein the discharge-free region is accessible to a gas medium, but is located at a position in the inter-electrode gap where the gas medium is not excited.

* * * * *

UNITED STATES PATENT AND TRADEMARK OFFICE
CERTIFICATE OF CORRECTION

PATENT NO. : 9,071,031 B2
APPLICATION NO. : 13/286048
DATED : June 30, 2015
INVENTOR(S) : Francisco Javier Villarreal-Saucedo et al.

Page 1 of 1

It is certified that error appears in the above-identified patent and that said Letters Patent is hereby corrected as shown below:

On the title page, item 75, last line, delete "New Britian, CT (US)" and insert --New Britain, CT (US)--.

Signed and Sealed this
Twelfth Day of January, 2016

Michelle K. Lee
*Director of the United States Patent and Trademark Office*